Patented Oct. 13, 1936

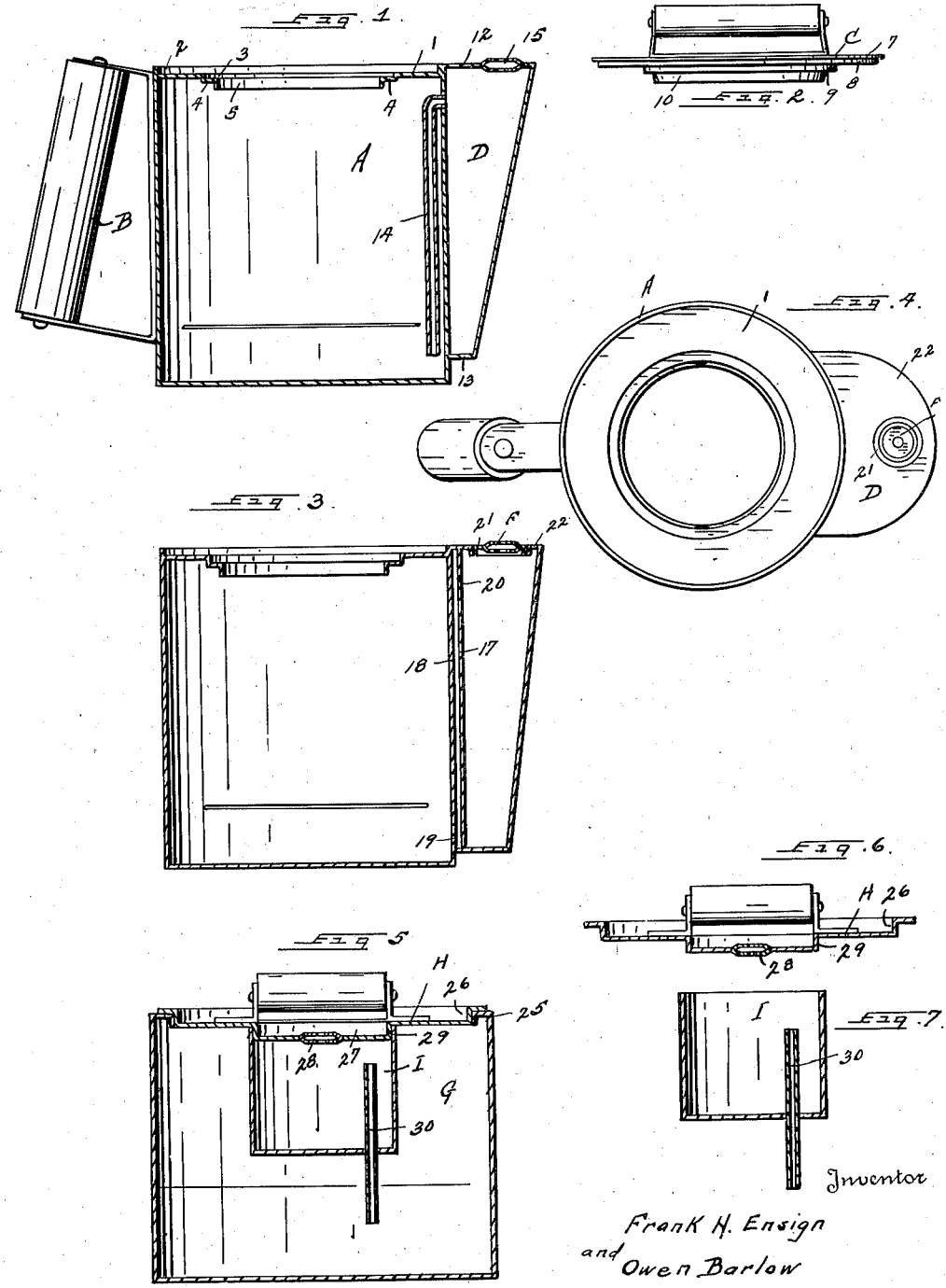

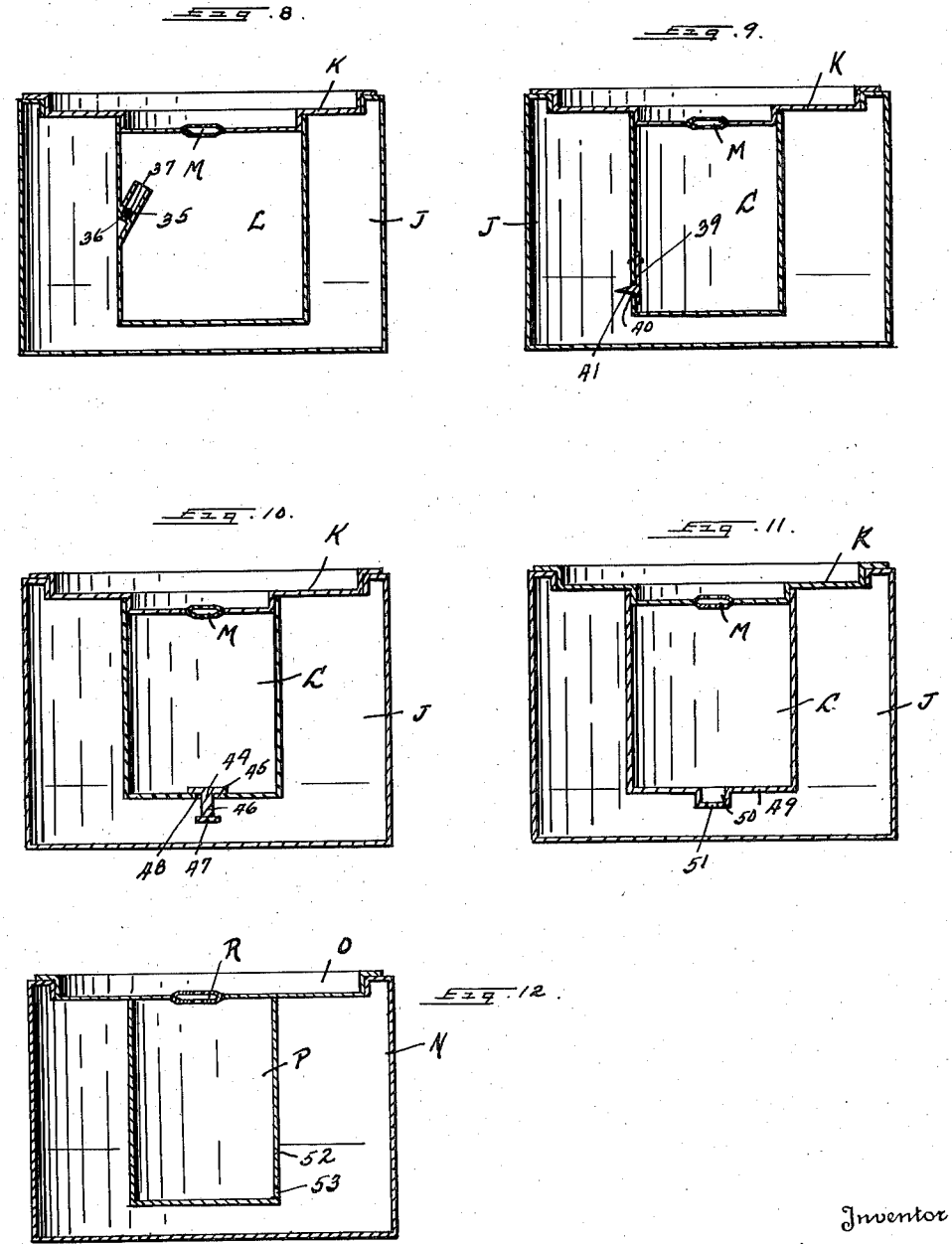

2,057,481

UNITED STATES PATENT OFFICE 2,057,481

EGG COOKER

Frank H. Ensign and Owen Barlow, Salt Lake City, Utah; said Barlow assignor to said Ensign Application October 11, 1934, Serial No. 747,865

3 Claims. (Cl. 53—1)

Our invention relates to egg-cooking devices and has for its object to provide a cooking utensil which will cook an egg perfectly with each use thereof.

A further object is to provide an egg cooking device which uses a minimum of water and the displacement of the water from one compartment into the other regulates the length of time for cooking the eggs.

These objects we accomplish with the device illustrated in the accompanying drawings in which similar numerals and letters of reference indicate like parts throughout the several views and as described in the specification forming a part of this application and pointed out in the appended claims.

In the drawings in which we have shown our invention

Figure 1 is a vertical diametrical section of the device.

Figure 2 is a side elevation of the lid for Figure 1.

Figure 3 is a vertical diametrical section of the device modified in form.

Figure 4 is a plan view of Figure 1.

Figure 5 is vertical diametrical section of another form of the device.

Figure 6 is a section of the lid for Figure 5.

Figure 7 is a section of the water compartment used in Figure 5.

Figure 8 is a vertical diametrical section of a form in which the control from the water compartment to the inner water compartment is controlled by a ball check valve of the gravity type.

Figure 9 is a vertical section of a modified form of the device in which a spring leaf valve controls the flow of water and steam.

Figure 10 is a vertical section of a form of device in which the control valve is a weight gravity valve.

Figure 11 is a vertical section of a form of device in which neither a valve nor a pipe is used to control the water.

Figure 12 is a sectional view of a device in which the lid has a compartment formed thereon to catch the displaced water with no valves used to control the flow of water to the compartment.

In the drawings we have shown the device as a cylindrical vessel A, to which a suitable handle B is secured to handle the device. The top of the vessel A is partially closed by an annular plate 1 having a flange 2 around the entire perimeter of the vessel A. The inner edge of the plate 1 is turned down at 3 and down again at 5 with a parallel section 4 spacing the two turned down edges 3 and 5 apart. The lid C for the vessel A is provided with a flat top plate 7 having a depending section 8 adapted to fit into the flange 2, and with a further drop 9 to fit the edge 3 and a central drop 10 to fit the edge 5 so that the lid will be perfectly sealed to the vessel A when pressed down slightly into place. Some of the edges such as 3 and 5 may be made slightly sloping inwardly and thus provide a more positive lock between the lid and the vessel.

Onto one side of the vessel A we then provide the water chamber D which consists of a semi-cylindrical chamber fitted to and soldered to one side of the vessel A with the top of the chamber D closed by a plate 12 and the bottom by a plate 13. In the top plate 12 of the chamber D we then place our signal 15 which consists of the usual air type whistle made by securing two perforated plates together with the perforations in alignment.

A pipe 14 is then secured through the side wall of the vessel A with the bottom end spaced from the bottom end of the vessel A and with the top end curved over and passed through the side wall of the vessel A into direct communication with the interior of the water chamber D.

In Figure 3 we have eliminated the pipe and instead of the pipe we place a wall 17 spaced from the wall 18 of the vessel A so that this will take the place of the pipe shown in Figure 1 and we then provide an inlet port 19 through the wall 18 into the space between the two walls and an outlet port 20 through the wall 17 into the water chamber. Thus, the device will operate the same as that of Figure 1. In Figure 3 we have also shown the signal F of a form identical to that used in the other figure with the exception that this signal F is secured through a closure plug 21 secured through the top 22 of the water compartment and the plug 21 may be removed if desired to drain the water compartment.

In Figures 5, 6, and 7, we have shown another form of the device in which a vessel G has the top 25 flanged inwardly to receive the flanged edge 26 of the lid H and the central portion 27 of the lid is depressed to receive the water compartment I. The signal 28 is secured through the depressed portion 27 and a simple water compartment I, cup-shaped in form, is pressed up onto the flange 29 of the central portion 27.

The pass from the vessel or body into the water compartment is made by securing a tube 30 through the bottom of the water compartment I and the water is forced up through this tube by the pressure of the steam on the top of the water in the vessel surrounding the water compartment. It is possible to make this lid fit into any cooking vessel and any vessel may be used for this device.

In Figures 8, 9, 10, and 11, we have shown the lid as K and the vessel as J with the water compartment shown as L and the whistle as M. In these devices the vessel, lid, water compartments and whistles are identical and the only difference being the valves shown to control the flow of water and steam into the water compartment.

The type of valve shown in Figure 8 is made by securing a ball tube 35 onto the inner side of the compartment L and in this tube there is a valve seat 36 onto which the check valve ball 37 is adapted to seat. When steam pressure is built up in the vessel J the water will be forced through the seat and tube into the compartment L until the level of the water surrounding the water compartment is below the entrance to the tube at which time the steam passing through the tube into the compartment L will sound the whistle M.

In Figure 9 the valve is shown as a plate valve 39 closing a port 40 by a cone 41 and the pressure of the water and steam will open the cone forcing the water into the water compartment until the level is low enough to allow the steam to pass through the port and sound the whistle.

In Figure 10 the control valve is shown as a gravity valve 44 made of a top closure plate 45, a depending stem 46 and a limiting prong 47. The pressure of the water and steam 46 must raise the plate 45 from the port 48 and allow the water to be forced into the compartment L until the level is below the bottom of the compartment in this device and the steam will then pass through the port and through the water in the compartment and sound the whistle.

In Figure 11 the vessel is provided with a compartment L and this compartment has a depression 50 formed in the bottom 49 of the compartment L and a port 51 is provided through the depression. The depression extends down into the water and the steam forces the water up through the port to displace the water and fill the compartment L until such time as the water has been forced from the vessel to a low level which will allow the steam to pass through the port directly through the compartment L and sound the alarm whistle M.

In Figure 12 the vessel is shown as N with a cover C therefor having a pressed fit thereinto. The bottom side of the cover has a water compartment P secured thereonto and a whistle R is placed through the cover O within the compartment P. A port 53 is formed through the side wall 52 of the device through which the water is forced into the compartment to time the cooking of the eggs.

The operation of all of the different devices is in essence the same; the eggs are placed in the vessel and water placed therein sufficient to reach a predetermined level shown by a mark on the side of the vessel. The vessel is then set over a hot flame and the lid placed firmly in place.

The pressure of the steam over the water will press down on the water and displace some of the water forcing it over into the water compartment until the opening thereinto is below the level of the opening at which time steam will pass through the water compartment and sound the alarm whistle, or in the case of the devices shown in Figures 9, 10, 11, and 12, the steam will bubble up through the water and sound the whistle.

In the later type of signals, the steam bubbling up through the water will make the whistle trill by the intermittent movement of the steam.

Having thus described our invention we desire to secure by Letters Patent and claim:

1. In an egg cooking vessel the combination of a cylindrical vessel; a semi-circular tapered water compartment formed onto one side thereof having a conduit leading from the vessel into the water compartment and having the water compartment air tight; a double walled whistle mounted in the water compartment; and a cover for said vessel to retain steam pressure in said vessel sufficient to force water through the conduit into the water compartment until the water level is below the conduit level at which time steam pressure passes through the conduit to sound said whistle.

2. In an egg cooking vessel the combination of a cylindrical vessel; a lid for said vessel to entirely close the top thereof and sufficiently fitted to retain steam pressure in said vessel; a depending water compartment secured onto the underside of said lid; a port into said compartment at a predetermined level; and a whistle in the lid into said water compartment to sound when sufficient water has been displaced from the vessel into the water compartment to lower the level of the water below the level of the port and allow steam to pass through the water compartment to sound the whistle.

3. In an egg cooking vessel the combination of a vessel in which the eggs are to be placed; a lid for said vessel to fit firmly into the open top end of said vessel; said lid having a concentric depression formed on the under side in the medial portion thereof; a whistle mounted through said depression; and a water displacement compartment formed of a diameter to fit onto the lower outer perimeter of said depression to be pressed firmly thereon before the lid is placed on the vessel, said compartment having a port thereinto below the water level of the vessel to allow steam pressure in said vessel to force water through said port into said compartment until sufficient water has been so displaced to allow steam to pass through said port, said steam to then pass up through said displaced water and sound said whistle to warn that the eggs are cooked.

FRANK H. ENSIGN.
OWEN BARLOW.